United States Patent
Xu et al.

(10) Patent No.: US 7,760,464 B2
(45) Date of Patent: Jul. 20, 2010

(54) BASE FOR DATA STORAGE DEVICE WITH PARALLELISM MOUNTING FEATURES

(75) Inventors: Mo Xu, Singapore (SG); YiRen Hong, Singapore (SG); Pohlye Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 604 days.

(21) Appl. No.: 11/222,058

(22) Filed: Sep. 8, 2005

(65) Prior Publication Data
US 2007/0053100 A1     Mar. 8, 2007

(51) Int. Cl.
*G11B 33/12* (2006.01)
(52) U.S. Cl. .................................... 360/97.01
(58) Field of Classification Search .............. 360/97.01, 360/97.02, 98.07, 99.08, 99.04; 310/67 R, 310/91, 90
See application file for complete search history.

(56) References Cited

U.S. PATENT DOCUMENTS

| | | | |
|---|---|---|---|
| 3,842,493 A | 10/1974 | Ohuchi, et al. | |
| 5,304,879 A * | 4/1994 | Suzuki et al. | 310/67 R |
| 5,319,270 A * | 6/1994 | Tanaka et al. | 310/67 R |
| 5,337,374 A * | 8/1994 | Konishikawa | 384/107 |
| 5,414,574 A | 5/1995 | Boutaghou et al. | |
| 5,434,729 A * | 7/1995 | Katakura et al. | 360/99.08 |
| 5,475,274 A * | 12/1995 | Katakura | 310/67 R |
| 5,596,461 A | 1/1997 | Stefansky | |
| 5,657,182 A | 8/1997 | Kuwamoto et al. | |
| 5,760,504 A * | 6/1998 | Moser | 310/67 R |
| 5,765,275 A * | 6/1998 | Obara | 29/603.03 |
| 5,768,049 A | 6/1998 | Morehouse et al. | |
| 5,870,248 A | 2/1999 | Akutsu et al. | |
| 6,034,841 A | 3/2000 | Albrecht et al. | |
| 6,178,061 B1 | 1/2001 | Obara | |
| 6,242,830 B1 * | 6/2001 | Katagiri | 310/90 |
| 6,278,574 B1 | 8/2001 | Wakita et al. | |
| 6,372,315 B1 * | 4/2002 | Schmidt et al. | 428/34.1 |
| 6,426,847 B1 | 7/2002 | Dague et al. | |
| 6,455,961 B1 * | 9/2002 | Higuchi | 310/67 R |
| 6,501,616 B1 | 12/2002 | Neal | |
| 6,534,890 B2 * | 3/2003 | Rafaelof | 310/91 |
| 6,552,870 B2 * | 4/2003 | Komatsu et al. | 360/97.01 |
| 6,567,362 B1 * | 5/2003 | Kagaya et al. | 720/675 |
| 6,570,736 B2 | 5/2003 | Noda | |
| 6,608,732 B2 * | 8/2003 | Bernett et al. | 360/97.02 |
| 6,816,337 B1 | 11/2004 | Mukaijima et al. | |
| 6,844,636 B2 | 1/2005 | Lieu et al. | |
| 6,921,993 B2 * | 7/2005 | Xu et al. | 310/67 R |
| 6,982,850 B1 * | 1/2006 | Ying | 360/97.01 |
| 7,067,944 B2 * | 6/2006 | Lieu et al. | 310/43 |

(Continued)

FOREIGN PATENT DOCUMENTS

JP     04067755 A  *  3/1992

(Continued)

*Primary Examiner*—William J Klimowicz
(74) *Attorney, Agent, or Firm*—Fellers, Snider et al.

(57) ABSTRACT

An apparatus and associated method for making a base for a data storage device. The base has a plurality of raised pads defining coplanar supporting surfaces. The surfaces are adapted for supportingly engaging intermittent portions of a component supported by the base so that the base clearingly disengages other portions of the component between the pads.

15 Claims, 5 Drawing Sheets

U.S. PATENT DOCUMENTS

| | | | |
|---|---|---|---|
| 7,084,536 B2 * | 8/2006 | Obata et al. .................... | 310/90 |
| 7,146,713 B1 * | 12/2006 | Ying ........................ | 29/603.16 |
| 7,436,625 B1 * | 10/2008 | Chiou et al. ............. | 360/98.07 |
| 2001/0010608 A1 * | 8/2001 | Komatsu et al. ......... | 360/97.01 |
| 2001/0042301 A1 | 11/2001 | Khuu | |
| 2002/0047339 A1 * | 4/2002 | Bernett et al. ................. | 310/51 |
| 2005/0057107 A1 * | 3/2005 | Xu et al. ................... | 310/67 R |
| 2006/0221493 A1 * | 10/2006 | Chee et al. ............... | 360/97.01 |

FOREIGN PATENT DOCUMENTS

| | | | |
|---|---|---|---|
| JP | 04147470 A | * | 5/1992 |
| JP | 04147471 A | * | 5/1992 |
| JP | 04178149 A | * | 6/1992 |
| JP | 04178150 A | * | 6/1992 |
| JP | 04178151 A | * | 6/1992 |
| JP | 04178153 A | * | 6/1992 |
| JP | 04178154 A | * | 6/1992 |
| JP | 04178155 A | * | 6/1992 |
| JP | 04178156 A | * | 6/1992 |
| JP | 04178157 A | * | 6/1992 |
| JP | 06098515 A | * | 4/1994 |
| JP | 09247901 A | * | 9/1997 |
| JP | 2000245122 A | * | 9/2000 |
| JP | 2000295811 A | * | 10/2000 |
| JP | 2001101777 A | * | 4/2001 |
| JP | 2001101778 A | * | 4/2001 |
| JP | 2002101592 A | * | 4/2002 |
| JP | 2002125354 A | * | 4/2002 |
| JP | 2003134732 A | * | 5/2003 |
| JP | 2003324891 A | * | 11/2003 |
| JP | 2004304918 A | * | 10/2004 |
| JP | 2005229769 A | * | 8/2005 |

* cited by examiner

BASE FOR DATA STORAGE DEVICE WITH PARALLELISM MOUNTING FEATURES

FIELD OF THE INVENTION

The claimed invention relates generally to the field of data storage and more particularly, but not by way of limitation, to an apparatus and method for providing a base for a small form factor data storage device from a stamping.

BACKGROUND

IBM's first entry into direct memory access, RAMAC in 1957, had a 5 megabyte storage capacity existing on fifty 24 inch data storage discs. By the 1980s, the rate at which areal density increased yielded a single 5.25 inch disc with the same 5 megabyte storage capacity. The industry has continued to evolve into ever-smaller form factors according to a standardized scaling methodology. Today, the 5.25 inch form factor is obsolete, having been replaced with the 3.5 inch and 2.5 inch form factors, and more recently with one-inch and sub-one-inch form factors. This evolution has also reduced the form factor profile, resultingly decreasing the material thicknesses of components forming the enclosure.

The evolution driving the scaling methodology has been skewed by the proliferation of consumer products employing disc drives. This market is extremely cost sensitive, driving a trend away from base members made from aluminum castings in favor of base members made from stampings. In order to achieve the necessary stiffness from a stamped part, a steel material such as stainless steel or cold rolled steel is preferably used. However, the base member advantageously provides precise mounting surfaces for ensuring proper parallelism between the data storage disc and other components interacting with the disc. A base made from steel makes secondary machining operations of such critical mounting surfaces problematic in comparison to machining aluminum. With the shift to steel, cutter tooling replacement and machining cycle times, for example, have become significant opportunities for product cost reductions.

The future demand will be for ever-smaller disc drive enclosures. As more powerful electronics are packed into the same or smaller space, it will be necessary to stay abreast of the size requirements by miniaturizing and compacting mating assemblies, such as the mating of the base member with a printed circuit board, to the greatest extent possible. What is needed is a solution that provides a base member from a stamping with the necessary strength and parallelism attributes but with no or minimal secondary machining operations. It is to these improvements that the embodiments of the present invention are directed.

SUMMARY OF THE INVENTION

Embodiments of the present invention are generally directed to a data storage system.

In some embodiments a base for a data storage device is provided comprising a plurality of raised pads defining coplanar supporting surfaces. The surfaces are adapted for supportingly engaging intermittent portions of a component supported by the base so that the base clearingly disengages other portions of the component between the pads.

In other embodiments a method is provided for supporting a component in a data storage device. The method includes stamping a base member; coining a plurality of raised pads in the base member defining coplanar supporting surfaces; placing the component on the plurality of raised pads; and attaching the component to the base member.

In other embodiments a data storage device is provided comprising a data storage medium in a data storing and retrieving relationship with a data transfer device, and means for supporting a component in relation to the data storage medium. The means for supporting can be characterized by a base member with parallelism features for locating a motor which, in turn, supports the data storage medium. The means for supporting can be characterized by a base member with parallelism features for locating a component which, in turn, supports the data transfer device.

These and various other features and advantages which characterize the claimed invention will become apparent upon reading the following detailed description and upon reviewing the associated drawings.

DETAILED DESCRIPTION

Figure 1:
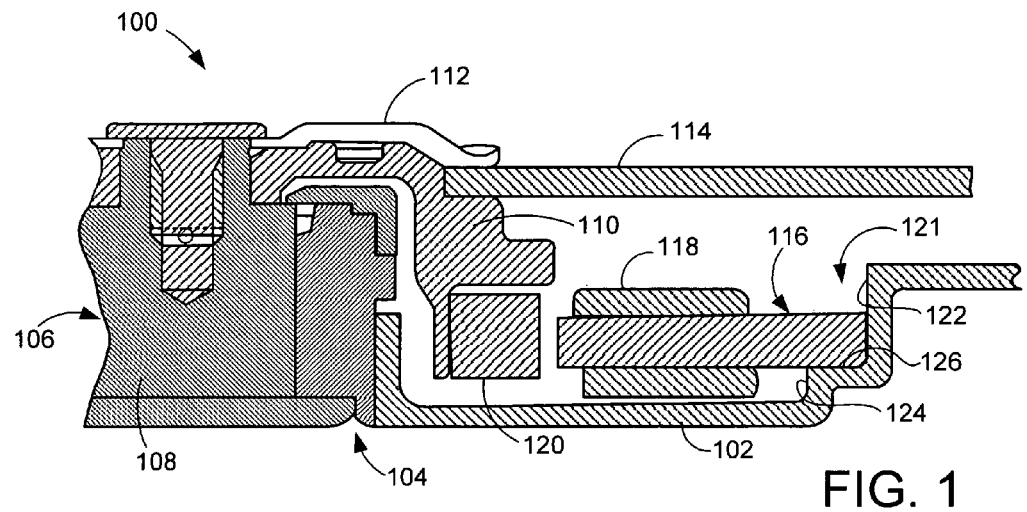
FIG. 1 is a cross sectional view of a portion of a data storage device constructed in accordance with embodiments of the present invention.

FIG. 1 is a cross sectional view of a portion of a data storage device 100 that is constructed in accordance with embodiments of the present invention. A base member 102 defines an aperture 104 into which a portion of a motor 106 is receivingly engaged and attached to the base member 102. The motor 106 has a centrally disposed stationary spindle 108 around which a hub 110 is rotatable. A clamp 112 fixes a data storage medium 114 in rotation with the hub 110. The motor 106 further has a stator 116 including an electrical coil 118 that, when energized with an electric current, interacts with a magnet member 120 attached to the hub 110 to exert an electromotive force spinning the data storage medium 114. Generally, the stator 116 is receivingly engaged within a counterbore 121 defined by the base member 102 by first and second longitudinal surfaces 122, 124, respectively, intersecting opposing ends of a lateral surface 126.

Figure 2:
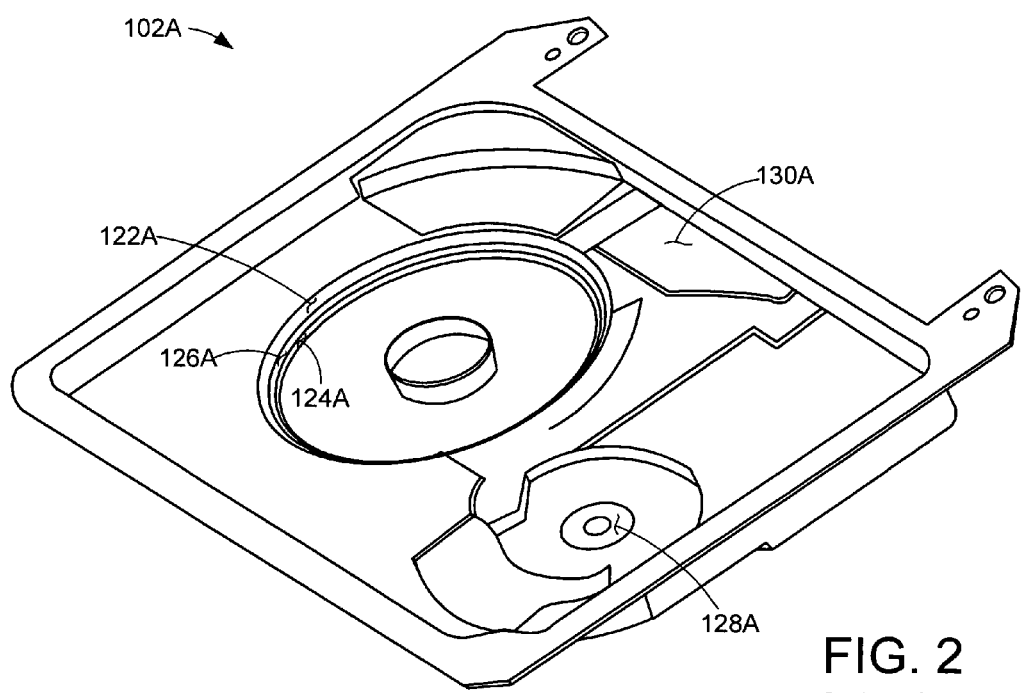
FIG. 2 is an isometric view of a stamped base member constructed in accordance with previous solutions.

FIG. 2 is an isometric view of a base member 102A illustrative of difficulties associated with previous solutions aimed at providing a small form factor enclosure from a stamping. Generally, these difficulties arise from using relatively large areas for critical locating surfaces. That is, stamping full features, such as an annular portion of the component, with the precision that is necessary for a critical locating surface can make tooling and manufacturing processes prohibitively expensive. There are a number of surfaces of the base member 102A that are important to the parallelism required for properly aligning mating components. For example, by providing a close mating engagement between the first cylindrical surface 122A and the outside diameter of the stator 116, the first cylindrical surface 122A becomes deterministic of the concentricity of the stator 116 around the magnet member 120. The lateral surface 126A is deterministic of the alignment of the stator 116 with the magnet member 120. Other surfaces key to the required parallelism include a surface 128A that supports an actuator moving a head in a data storing and retrieving relationship with the data storage medium 114, and a surface 130A that supports a head load/unload ramp.

Figure 3:
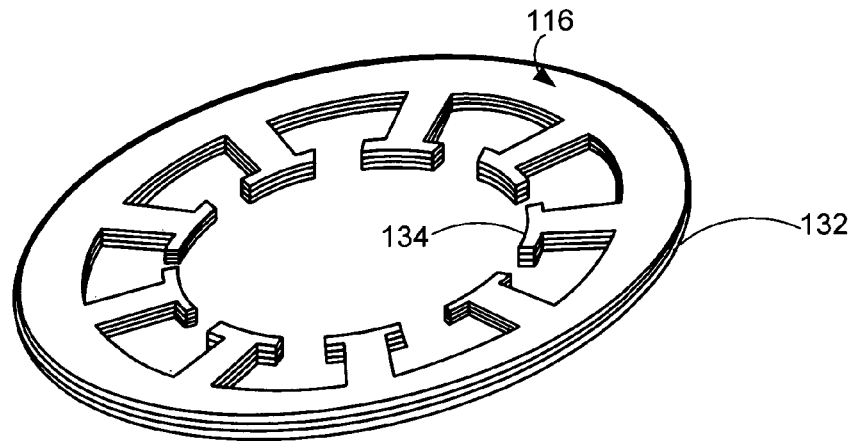
FIG. 3 is an isometric view of the motor stator portion of the data storage device of FIG. 1 without the coil.
Figure 4:
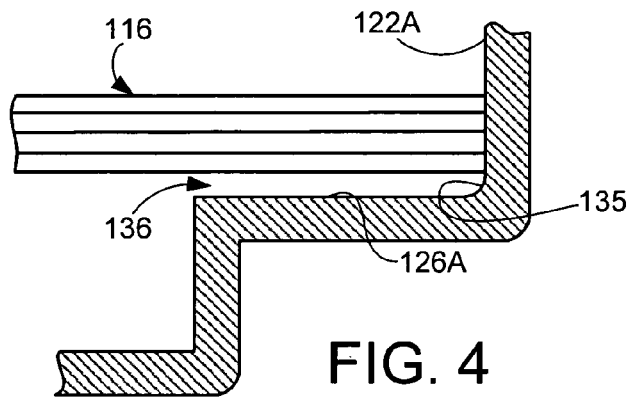
FIG. 4 is an elevational view of a previous solution for assembling the motor stator to the base member.

FIG. 3 is an isometric view of the stator 116 (without the coil 118) having an outer edge 132 defining an outside diameter, and an inner discontinuous edge 134 adapted for winding wire to form the coil 118. FIG. 4 illustrates a problem associated with previous solutions wherein a stamping typically leaves a radiused corner 135 between the lateral surface 126A and the first longitudinal surface 122A. One solution is to bottom the stator 116 out on the leading end of the radiused corner 135, as illustrated in FIG. 4. However, this makes the resulting enclosure larger than necessary by the amount of the gap 136 between the stator 116 and the lateral surface 124A. Also, not supporting the stator 116 by the lateral surface 126A results in increased noise and/or vibration. For these reasons, the radiused corner 135 is typically machined in a secondary operation to reduce the radius as much as possible.

Figure 5:
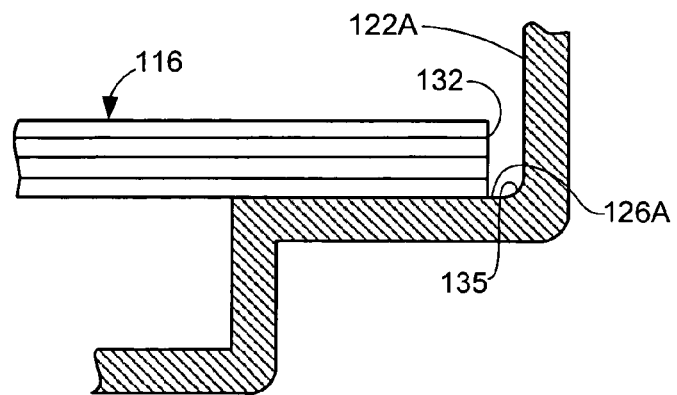
FIG. 5 is an elevational view of another previous solution for assembling the motor stator to the base member.

FIG. 5 is an alternative previous solution associated with reducing the outside diameter of the stator 116 so that the edge 132 clearingly disengages the radiused corner 135. However, doing so defeats the advantages of closely mating the stator 116 outside diameter within the major diameter of the counterbore 121; that is, the first longitudinal surface 122A no longer squares and centers the stator 116 around the hub 110.

Figure 6:
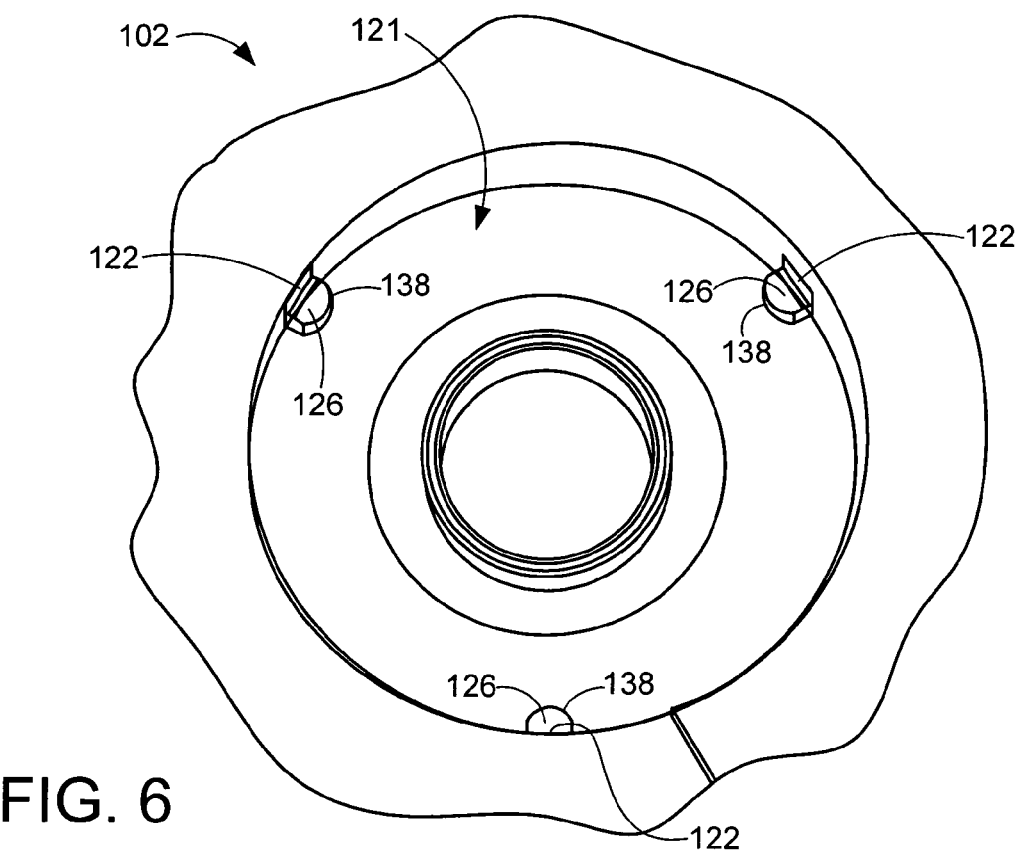
FIG. 6 is an isometric view of a portion of a stamped base member similar to FIG. 2 but constructed in accordance with embodiments of the present invention.

FIG. 6 shows a portion of the base 102 in accordance with embodiments of the present invention having a plurality of coined pads 138 defining coplanar supporting surfaces 126 that supportingly engage intermittent portions of the stator 116, and otherwise clearingly disengage the stator 116 at other portions between the pads 138. The coined pads 138 also define the first longitudinal surface 122. Parallelism is enhanced by coining the intermittent support surfaces 122, 126 instead of locating the stator 116 on the continuous support surfaces 122A, 126A (FIG. 2). The coining operation can be made precise enough to produce support surfaces 122, 126 that require no secondary machining operations. Alternatively, if secondary machining is necessary, then the amount of support surfaces 122, 126 is substantially reduced.

Figure 7:
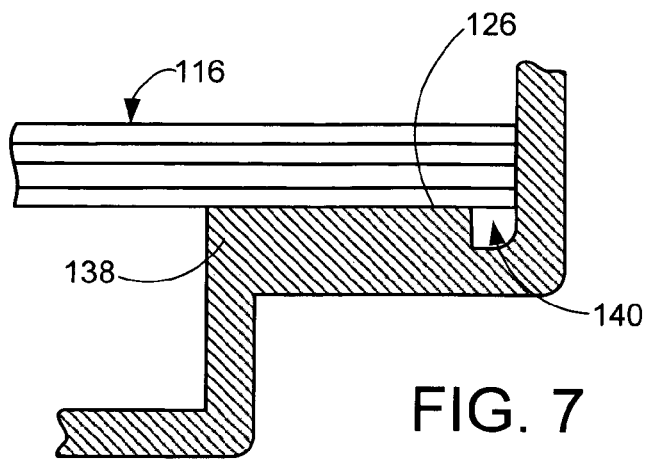
FIG. 7 is a partial cross sectional view of the base member of FIG. 6.

FIG. 7 shows how the coining operation producing the pads 138 can also define an undercut 140 in the lateral surface 126. By clearingly eliminating the radius 135, the stator 116 can be placed squarely within the major diameter of the counterbore 121 (FIG. 6) and positively located and supported against the lateral surface 126.

FIG. 6 illustrates the manner in which three of the pads 138 can be triangulated equidistantly around the counterbore 121 serving as parallelism features for positioning the stator 116 in coaxial alignment with the counterbore 121. In alternative equivalent embodiments fewer or more pads 138 can be used in a similar manner, such as may be expedient with features of a particular component, such as the stator, being positioned within the counterbore 121.

Figure 8:
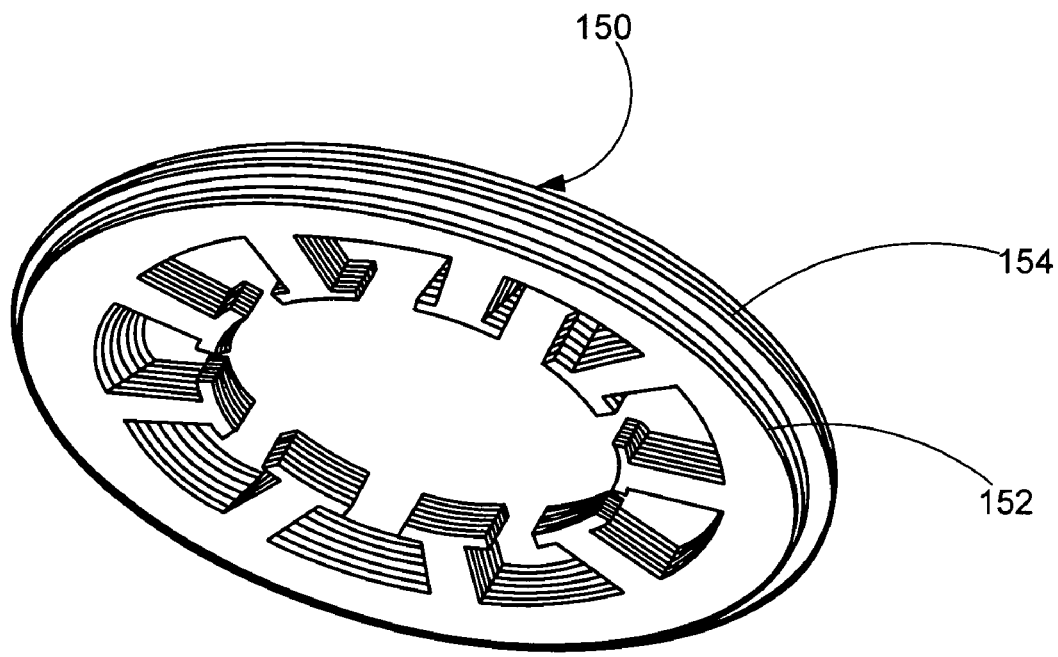
FIG. 8 is an isometric view of a motor stator without the coil used in conjunction with embodiments of the present invention.
Figure 9:
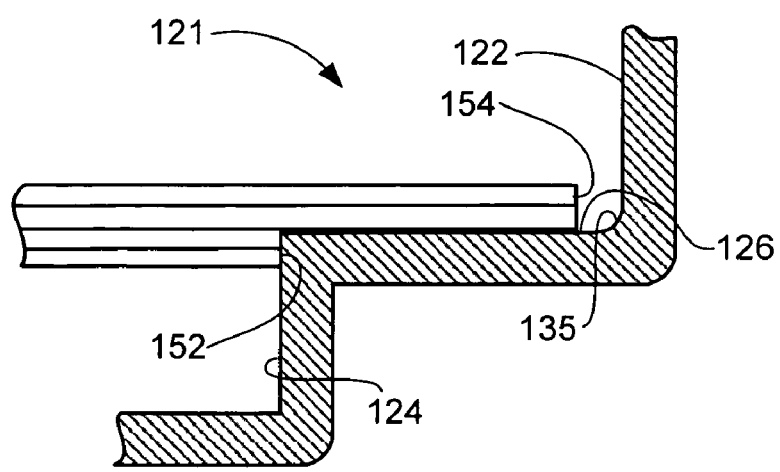
FIG. 9 is an elevational view of a portion of a data storage device assembled with the motor stator of FIG. 8.

It will be noted from FIG. 7 that the entire thickness of the stator 116 is supportingly disposed above the lateral surface 126. FIG. 8 is an isometric view of a modified stator 150 (without the coil 118) that can be used in embodiments of the present invention for a reduced disc drive profile. The stator 150 is stepped, having an edge 152 defining a first outside diameter and an edge 154 defining a second outside diameter larger than the first outside diameter. As shown in FIG. 9, the edge 152 can define an outside diameter that is sized for a close mating engagement with the minor diameter of the counterbore 121 defined by the second longitudinal surface 124 in order to provide the requisite parallelism and concentricity between the stator 116 and the counterbore 121. This arrangement permits the edge 154 to be clearingly relieved from any interference with the radius 135 without having to coin an undercut 140.

Figure 10:
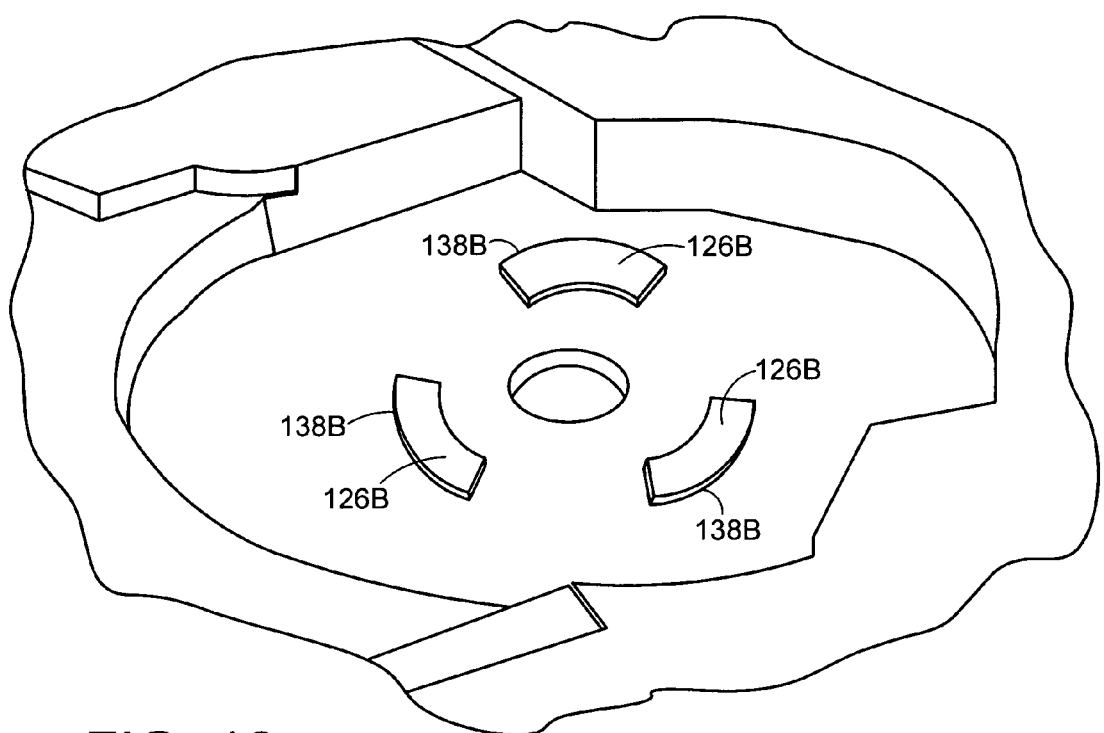
FIGS. 10 and 11 are isometric views of portions of a stamped base member similar to FIG. 2 but constructed in accordance with embodiments of the present invention.
Figure 11:
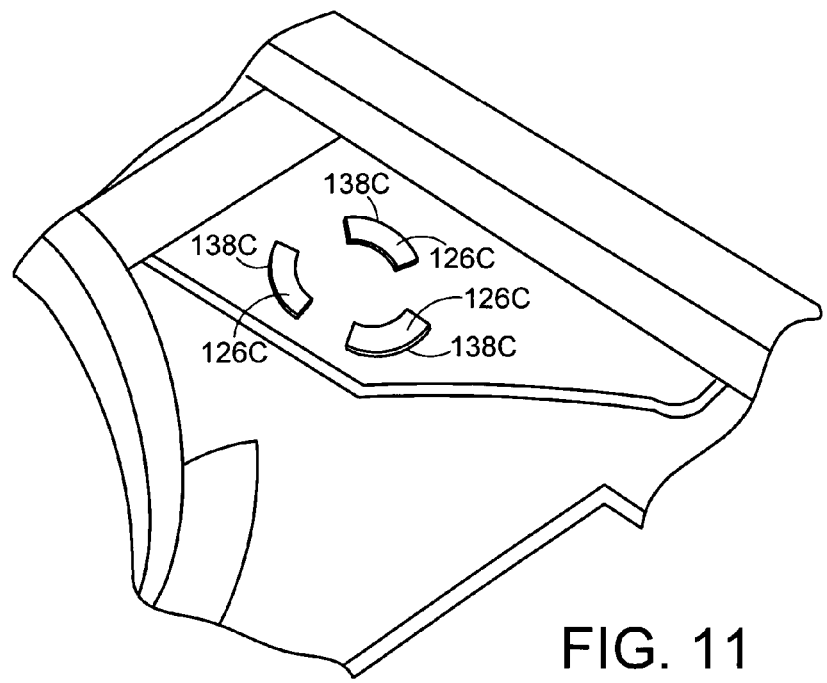

The embodiments discussed above explain how the plurality of discontinuous coined pads 138 are advantageous for supporting the motor 106 as opposed to the continuous support surface 122A, 126A of FIG. 2. In alternative equivalent embodiments other components can be supported similarly. FIG. 10, for example, is an enlarged detail of a portion of the base 102, similar to a portion of FIG. 2, but having three pads 138B triangulated equidistantly for supporting an actuator member that supports a read/write member in a data transfer relationship with the data storage medium 114. The coined pads 138B define coplanar supporting surfaces 126B that are adapted for supportingly engaging intermittent portions of the actuator so that the base 102 clearingly disengages other portions of the actuator between the pads 138B. In a similar manner, FIG. 11 shows a portion of the base 102 similar to FIG. 2 but wherein three coined pads 138C define support surfaces 126C for supporting a head load/unload ramp as opposed to the support surface 130A of FIG. 2.

Summarizing, the embodiments of the present invention contemplate a base for a data storage device comprising a plurality of raised pads defining coplanar supporting surfaces. The supporting surfaces are adapted for supportingly engaging intermittent portions of a component supported by the base so that the base clearingly disengages other portions of the component between the pads.

For example, the component can be a motor and the base can define a counterbore comprising the pads that supportingly engage an outer annulus of a stator portion of the motor. As such, in some embodiments the base has a first longitudinal surface defining a major diameter of the counterbore that is sized for a close mating engagement with an outer diameter of the stator. In this arrangement the counterbore advantageously provides a parallelism mounting feature for the motor. Manufacturing allowances, however, can present a radiused corner interfering with fully seating the stator in the counterbore. Accordingly, an undercut can be provided in a lateral surface defining the counterbore at an intersection with the first longitudinal surface.

Embodiments of the present invention further contemplate an apparatus and associated method for reducing the thickness of the data storage device by using a stepped stator with a first edge defining a first diameter and a second edge defining a second diameter larger than the first diameter. The base defines a minor diameter of the counterbore that is sized for a close mating engagement with the first diameter of the stepped stator. The second diameter of the stepped stator can thus be relieved from the counterbore major diameter, alleviating any interference problems with the radiused corner.

The base can also be provided with raised pads for supporting other components, such as an actuator and a load/unload ramp, in a similar manner. Preferably, three pads are triangulated equidistantly, but fewer or more pads can be used in equivalent alternative embodiments.

The embodiments of the present invention further contemplate a method for supporting a component in a data storage device. The method includes stamping a base member, as opposed to providing the base member from a casting. As part of the stamping step, or as a secondary operation, the plurality of raised pads are coined in the base member defining a plurality of coplanar supporting surfaces. The component is then placed on the supporting surfaces and attached to the base member.

The attaching step can be characterized by using a fastener device, or in alternative equivalent embodiments other attachment means can be used such as an adhering material or a press fit of the mating parts.

In some embodiments the component is a motor, such that an outer annulus of a stator portion of the motor can be located upon the raised pads. The pads can be situated in the lateral portion of a counterbore formed in the base, such that the placing step is characterized by placing the stator outside diameter in a close mating engagement with the counterbore major inside diameter. In alternative equivalent embodiments, a reduced profile can be achieved by providing a stepped stator having a first diameter portion and a second diameter portion that is larger than the first diameter portion. In this arrangement, the placing step can be characterized by placing the stepped stator first diameter in a close mating engagement the counterbore minor inside diameter.

In addition to being a motor, the component can also be another component within the data storage device, such as an actuator or a load/unload ramp. In any event, the placing step is characterized by placing intermittent portions of the component against the pads so that the base member clearingly disengages the other portions of the component.

The embodiments of the present invention further contemplate a data storage device with a data storage medium in a data storing and retrieving relationship with a data transfer device, and means for supporting a component in relation to the data storage medium. The means for supporting can be characterized by a base member with parallelism features for locating a motor which, in turn, supports the data storage medium. The means for supporting can be characterized by a base member with parallelism features for locating a component which, in turn, supports the data transfer device.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage system, it will be appreciated by those skilled in the art that the claimed subject matter is not so limited and various other processing systems can utilize the embodiments of the present invention without departing from the spirit and scope of the claimed invention.

What is claimed is:

1. A base for a data storage device comprising a sheet of selected material stamped to form a base surface and coined to form a plurality of raised pads of the selected material which continuously extend from the base surface to define spaced apart coplanar base support surfaces adapted for supportingly engaging intermittent portions of a component above the base surface, the coining of each raised pad concurrently forming an undercut disposed between said pad and an associated circumferentially extending longitudinal surface which lies along an outermost diameter of a counterbore in which said pads are disposed.

2. The base of claim 1 wherein the component is a motor, the pads contactingly support a bottom surface of a stator portion of said motor, and the circumferentially extending longitudinal surface contactingly engages an outermost edge surface of said stator portion.

3. The base of claim 1 wherein the selected material comprises steel and each of the base support surfaces, the undercuts and the longitudinal surfaces are concurrently formed by said coining operation and are not subjected to a subsequent secondary machining operation.

4. The base of claim 1 made by the process comprising the steps of:
    stamping the sheet of selected material to form a medial portion of selected thickness on which the base surface is defined;
    coining the raised pads to induce plastic deformation of the selected material so that the selected material continuously extends from the medial portion to the raised pads and said undercuts extend between the respective pads and the longitudinal surface;
    placing the component on the plurality of raised pads; and
    attaching the component to the base.

5. The base of claim 4 wherein the attaching step is characterized by press fitting the component to the base within said counterbore.

6. The base of claim 4 wherein the component is a motor and the placing step is characterized by placing a lower surface of a motor stator on the pads and an outermost edge surface of the motor stator in contacting engagement with the circumferentially extending longitudinal surface.

7. The base of claim 4 wherein the component is characterized by one or more selected components of a set consisting of a motor, an actuator, and a load/unload ramp.

8. The base of claim 1 wherein each undercut is defined by a second longitudinal surface substantially parallel to the circumferentially extending longitudinal surface and which extends from the associated base support surface of the associated pad, and a quarter-turn radiused corner surface which extends from the second longitudinal surface to the circumferentially extending longitudinal surface.

9. The base of claim 1 wherein the base has a first outer surface opposite the base surface to provide a first thickness of the selected material within the counterbore adjacent the respective pads, and the base has a second outer surface opposite the circumferentially extending longitudinal surface to provide a second thickness of the selected material substantially equal to the first thickness.

10. A data storage device comprising:
    a data storage medium in a data storing and retrieving relationship with a data transfer device; and
    a single piece base deck comprising a medial portion and a plurality of coined spaced apart pads which continuously extend from the medial portion to define coplanar supporting surfaces to support at least a selected one of the medium or the transfer device, the coined pads formed from a coining operation which induces plastic deformation of a sheet of selected material to concurrently form said pads and an undercut between each said pad and a circumferentially extending longitudinal surface which defines an outermost diameter of a counterbore in which said pads are disposed.

11. The data storage device of claim 10 wherein the base deck is characterized by a base member of said selected material with parallelism features integrally formed in the selected material for locating a motor which, in turn, supports the data storage medium.

12. A single piece base for a data storage device comprising a plurality of coined raised pads integrally formed in the base defining coplanar base support surfaces, the base support surfaces adapted for supportingly engaging intermittent portions of a component supported by the base so that other surfaces of the base clearingly disengage other portions of the component between the raised pads, each of the raised pads extending adjacent an outer diameter of a counterbore of the base defined by a circumferentially extending longitudinal surface to a first height that intersects a lateral surface that transitions from the outer diameter of the counterbore to a minor diameter with an undercut in the lateral surface between each said pad and said longitudinal surface.

13. The base of claim 12 made by a process comprising the steps of:
   stamping a sheet of selected material to form a medial portion of selected thickness on which a base surface is defined; and
   coining the raised pads to induce plastic deformation of the selected material so that the selected material continuously extends from the medial portion to the raised pads, said coining step concurrently forming each associated undercut.

14. The base of claim 12 formed from a sheet of material to provide a medial portion of first thickness from which the plurality of raised pads continuously extend, the pads each having a second thickness greater than the first thickness.

15. The base of claim 14 wherein each undercut is defined by a second longitudinal surface substantially parallel to the circumferentially extending longitudinal surface and which extends from the associated base support surface of the associated pad, and a quarter-turn radiused corner surface which extends from the second longitudinal surface to the circumferentially extending longitudinal surface.

* * * * *